(12) United States Patent
Solsvik

(10) Patent No.: US 6,248,166 B1
(45) Date of Patent: Jun. 19, 2001

(54) POROUS MATERIAL AND CEMENTITIOUS COMPOSITIONS PREPARED THEREFROM

(75) Inventor: Ronny Solsvik, Agotnes (NO)

(73) Assignee: MBT Holding AG, Zurich (CH)

( * ) Notice: Subject to any disclaimer, the term of this patent is extended or adjusted under 35 U.S.C. 154(b) by 0 days.

(21) Appl. No.: 09/423,676

(22) PCT Filed: Mar. 12, 1999

(86) PCT No.: PCT/NO99/00086

§ 371 Date: Nov. 10, 1999

§ 102(e) Date: Nov. 10, 1999

(87) PCT Pub. No.: WO99/46217

PCT Pub. Date: Sep. 16, 1999

(30) Foreign Application Priority Data

Mar. 12, 1998 (NO) .................................................... 981106

(51) Int. Cl.$^7$ .................................................. C04B 14/06
(52) U.S. Cl. ........................... 106/737; 428/404; 428/920
(58) Field of Search ............................ 106/737; 428/920; 428/404; 427/427

(56) References Cited

U.S. PATENT DOCUMENTS

| | | | |
|---|---|---|---|
| 1,716,749 | * | 6/1929 | Williamson . |
| 1,737,906 | * | 12/1929 | Adams . |
| 4,540,584 | * | 9/1985 | Someya .............................. 424/156 |
| 4,781,841 | * | 11/1988 | Someya .............................. 210/747 |
| 4,875,938 | * | 10/1989 | Filbert . |

FOREIGN PATENT DOCUMENTS

| | | | |
|---|---|---|---|
| 03209488 | * | 9/1982 | (DE) . |
| 115216 | * | 8/1984 | (EP) . |
| 55003325 | * | 1/1980 | (JP) . |
| 04250885 | * | 9/1982 | (JP) . |
| 58-114787 | * | 7/1983 | (JP) . |
| 58-116405 | * | 7/1983 | (JP) . |
| 61-209575 | * | 9/1986 | (JP) . |
| 61-212508 | * | 9/1986 | (JP) . |
| 62-144747 | * | 6/1987 | (JP) . |
| 04042810 | * | 2/1992 | (JP) . |
| 04334522 | * | 11/1992 | (JP) . |
| 08127762 | * | 5/1996 | (JP) . |
| 8310881 | * | 11/1996 | (JP) . |
| 80092 | * | 2/1934 | (SE) . |

OTHER PUBLICATIONS

"Adsorption of Simazine by Coral Sand as affected by the mineral structure" Kagawa et al. Kenkyu Hokaku—Kanto Gakuin Daigaku Kogakubu (1996) 39(2), 75–85.*

* cited by examiner

*Primary Examiner*—Paul Marcantoni
(74) *Attorney, Agent, or Firm*—Fish & Richardson P.C.

(57) ABSTRACT

A method of treating a shell sand by heating it to 300° C. maximum for a time sufficient to remove substantially all of the water and organic content while maintaining substantially all of the inherent porosity of the shell sand. Generally, the time required varies between 10 minutes maximum at 300° C. to about 1 hour at 95° C. The resulting material is useful in cementitious compositions, particularly mortars, these being characterised by a high flexibility and an exceptionally high degree of resistance to fire or heat.

15 Claims, No Drawings

POROUS MATERIAL AND CEMENTITIOUS COMPOSITIONS PREPARED THEREFROM

This invention relates to a method of treatment of shell sand and to the use of shell sand thus prepared in cementitious products.

In this specification the term "shell sand" includes also coral sand, and other finely-divided particles of basically calcareous material originating from marine animals such as coral, molluscs and the like. The chemical composition of shell sand is typically a mixture of calcium carbonate (calcite, aragonite and vaterites) and organic matter, plus sea salt. It is lower in density than mineral (silica) sand and is made lighter by an inherent porosity.

Shell sand has previously been used in cementitious compositions such as lightweight concretes and non-slip surfaces. This invention is based on the fact that a suitably processed shell sand gives an unexpected and very valuable result. The shell sand used in previous applications has been finely ground to a desired sieve size and then heated to around 350° C. to drive off the water and decompose any organic material present. However, this heating also has the effect of removing much of the natural elasticity and porosity of the shell sand. It is an important feature of this invention that the elasticity and porosity be retained to a high degree, because it has been found that such shell sand can be used in the preparation of a cementitious composition which has a high degree of fire- and heat-proofness.

The invention therefore provides a method of preparation of a shell sand comprising heating the shell sand at a temperature of less than 300° C. for a time sufficient to remove substantially all of the water and organic content while maintaining substantially all of the inherent porosity of the shell sand. Such a treatment regime has not been previously used and it results in a shell sand ready for use which has unique parameters and properties. The invention therefore also provides a dried shell sand having a particle size of 15 mm maximum and a porosity of from 10–25% by volume. Shell sand currently available generally has a particle size of 1 mm maximum and a porosity of no higher than 5%.

The process of preparing the shell sand according to this invention consists of heating at low temperatures for suitable times, in contrast to the processes of the known art. Prior to the heating stage, the shell sand is optionally washed with fresh water to remove the sea salt and some of the organic matter. In many cases, it is not important to do this, but it should be done where there will be use of the shell sand in conjunction with ferrous metals, for example, steel reinforcing used in conjunction with concrete or cement, as the salts can cause corrosion, leading to early failure.

The shell sand is preferably heated to a temperature of no higher than 300° C. It is surprising that, at this temperature, only 50 degrees lower than that used by the art, a considerable difference in retained porosity is observed. Preferably, the temperature should not exceed 250° C. The advantages of the present invention can be given at much lower temperatures, but it is preferred to go no lower than 95°–120° C., 100° C. having been found to be an especially useful maximum temperature in this lower range. Naturally, the lower the temperature the higher the degree of porosity retained, but the longer the heating time required. The heating may be carried out by any convenient method known to the art, one convenient apparatus being a tumble dryer which is pre-warmed to an appropriate temperature.

The time of heating needed may be readily determined for any given temperature and any given shell sand by the skilled person by means of simple experimentation. In the case of the maximum temperature of 300° C., the heating time should be no longer than 10 minutes, and shorter times of the order of 3–7 minutes may be used (5 minutes is a useful time in this range). Should lower temperatures be desired or necessary, the time may be longer, up to one hour being typical. It is possible to heat at these temperatures for longer, but the economics of the process then become less favourable.

When the heating is finished, the shell sand is, if necessary, reduced to the correct size. Ideally, the particle size should be no greater than 15 mm, preferably no greater than 6–10 mm, most preferably with most of the particles of size no greater than 8 mm. The shell sand produced by this process is a light, airy material with a pore volume of from 10–25%, preferably between 15% and 25%. The heating hereinabove described will drive off at least most, and in many cases all, of the water in the shell sand, and the material will feel dry. However, in some cases there may remain sufficient water such that the shell sand cannot be mixed with cement in a dry mortar composition without an undesirable degree of reaction taking place on storage. The removal of any final water may be achieved by art-recognised methods, using gentle heating (for example, at a temperature slightly above room temperature), preferably combined with agitation or forced ventilation. Thus, for example, when tumble drying is used, the heating hereinabove described can be followed by a period of tumbling at low temperature.

The shell sand can be employed in cementitious compositions. The invention therefore provides a cementitious composition, comprising at least one hydraulic binder and a shell sand as hereinabove described. Such cementitious compositions can, for example, be concretes, which can be cast or otherwise fabricated into blocks, pipes or other desired forms. The presence of the shell sand hereinabove described confers excellent flexibility and a surprisingly high degree of fire- or heat-proofness on the hardened compositions.

The hydraulic binder may be any hydraulic material known to the art. It may, for example, be Portland cement, high alumina cement, slag cement, sulphate-resistant cement or any of the other standard types, or mixtures of any of these types. The selection of a suitable cement or cements is completely within the skill of the art, readily determinable for every application.

Aggregate is a normal component of cementitious compositions and any aggregate known to the art may be used in the cementitious compositions of this invention. Aggregates used in the art range from very fine sands to coarse rock fragments, the sands being used in mortars and the coarser aggregates in concretes.

To the cementitious compositions may be added any of the known admixtures in art-recognised quantities to achieve expected effects. Examples include, but are by no means limited to:

workability-improving and water-reducing additives, such as β-naphthalene sulphonate-formaldehyde condensate (BNS), lignosulphonates and carboxylates;

accelerators, such as calcium chloride (where the chloride is not objectionable) and triethanolamine;

reinforcing fibres, such as glass, steel or plastics fibres, typically of the order of 10–20 mm in length.

Particularly good workability-improving additives for use in conjunction with this invention are the alkoxylated styrene-maleic anhydride copolymer types described in European Published Application 0 306 449, German Offenlegungsschrift 41 42 388 and PCT Application WO 97/39037, and the carboxylated acrylic polymer types described in European Published Application 0 753 488.

An especially useful application of the shell sand of this invention is in the manufacture of mortar compositions. Such compositions have become of great interest to the tunnelling industry in particular, in the aftermath of the investigation of several fires in tunnels, especially in the Channel Tunnel, where it has been found that concrete lining is not so impervious to fire as was previously assumed, and that severe and sometimes potentially disastrous cracking can result. The invention provides a fire- or heat-resistant mortar composition, comprising at least one hydraulic binder and a shell sand as hereinabove described.

The invention also provides a method of providing a concrete substrate with fire or heat resistance, comprising the application thereto of a mortar composition which comprises shell sand as hereinabove described.

Mortars generally comprise fine aggregate, typically mineral (quartz) sand, and the mortars of this invention may contain such sand. However, it has been found that the best heat and fire performance is obtained when the sole aggregate present is shell sand as hereinabove described. The invention therefore provides a fire- and heat-resistant mortar composition whose sole aggregate is such shell sand.

The invention further provides a fire- or heat-resistant concrete substrate which comprises an outer layer of a mortar composition which comprises shell sand as hereinabove described.

The mortar compositions of this invention may contain any of the standard admixtures in art-recognised quantities. They may be applied to substrates by any convenient means, for example, by pouring, trowelling or spraying. When the mortar is to be sprayed, this may be done either by the wet or the dry method. In both cases, an accelerator is injected at the nozzle. This accelerator may be one of the familiar aluminate or silicate types, but preferably it is one of the newer alkali-free types based on aluminium compounds such as aluminium hydroxide, aluminium hydroxysulphate and aluminium sulphate. Especially preferred accelerators are those described in European Published Application 0 812 812 and PCT Application WO 96/05150.

A typical mortar composition has the following composition

| | |
|---|---|
| shell sand | 1000 kg |
| lime | 100 kg |
| cement (Portland) | 300 kg |
| sulphate-resistant cement | 25 kg |

Water is added to give a W/C ratio of 0.45.

A typical spraying mortar composition has the following formula:

| | |
|---|---|
| shell sand | 1000 kg |
| lime | 60 kg |
| Portland cement | 225 kg |
| sulphate-resistant cement | 25 kg |
| steel fibres (20 mm) | 20 kg |
| BNS | 4.5 kg |
| polypropylene fibres (18 mm) | 1.5 kg |

This is pumped at a W/C ratio of 0.4. An accelerator is injected at the nozzle.

The spraying mortar hereinabove described has a density of 992 g/cm$^3$ and a porosity of 15–25%. It is outstandingly fire- and heat-proof, able easily to meet and surpass standard requirements without any appreciable cracking or fissuring.

The invention is further described with reference to the following specific, non-limiting examples.

Preparation of Shell Sand

A coarse shell sand obtained by dredging from the sea bed has a measured porosity of 20%. It is washed thoroughly in fresh water to remove all sea salts and much of the organic material. It is then added to a tumble dryer preheated to 100° C. The temperature is quickly raised to 250° C. and the material is tumbled for 5 minutes at this temperature. At this point heating is stopped and the material allowed to cool in the dryer for a further hour while still tumbling. The porosity of the shell sand is measured at 18%. It is removed from the dryer and crushed to a particle size of 8 mm maximum. This material, which is light and free-flowing, has substantially no water or organic content and is used in the compositions which are tested in the following examples.

Heat Resistance Examples (a) Samples of the spraying mortar whose composition is hereinabove described are cast into blocks of dimensions 10 cm×10 cm×2 cm. These are placed in a tubular furnace and heated to 800° C. over a period of 30 minutes. The samples are allowed to cool and are inspected. There are no visible changes in the blocks, most particularly and importantly, there are no cracks or deformations.

(b) A cast sphere of the spraying mortar, 20 cm in diameter, is heated with a welding flame at one point on its surface for 15 min. At this stage, the sample is red-hot over an area of 2 cm diameter form the flame point and to a depth of 2 cm. The temperature at the surface point diametrically opposite that at which the flame was applied was approximately 50° C. at the end of the 15 min. After cooling, the condition of the sphere is indistinguishable from that prior to heating.

Standard Testing of the Mortar

The testing is carried out according to ISO standard 1182:1990 (E), IMO FTPC Part I and IMO Res A.799(19), which are the recognised industrial standards. The samples used in the testing are slightly different to those described in ISO 1182. These are cylindrical samples of 41.3 mm diameter and 55 mm height. They are first conditioned by being heated in a furnace at 60° C. for 24 hours and then allowed to cool in a desiccator.

The test is carried out in a vertical, open tubular furnace which is preheated to 750° C. the test samples are weighed, and then inserted into the top of the furnace. They are heated for 30 minutes. During this time, temperatures at the surface and at the centre of the samples are measured and the test samples are observed for signs of sustained flaming, that is, the tendency of the material to continue to burn with its own flame after withdrawal of the gas flame of the furnace. At the end of the test, the samples are reweighed.

The results are shown in Table 1.

TABLE I

TEST RESULTS
Results of the tests on shell-sand mortar
in accordance with ISO 1182:1990 (E) and IMO Res.A.799(19)

| Test Number | 1 | 2 | 3 | 4 | 5 | Average |
|---|---|---|---|---|---|---|
| Loss of mass (%) | 12,6 | 12,1 | 11,3 | 16,5 | 12,7 | 13,0 |
| Sustained flaming (S) | 0 | 0 | 0 | 0 | 0 | 0 |
| Start temperature in the furnace (° C.) | 747,4 | 739,6 | 744,2 | 742,6 | 745,6 | 743,9 |
| Maximum furnace temperature (° C.) | 777,0 | 779,0 | 778,0 | 774,0 | 783,0 | 778,2 |
| Temperature in the furnace at the end of the test (° C.) | 774,3 | 775,2 | 775,6 | 770,8 | 780,6 | 775,3 |
| Difference in furnace temperature (° C.) | 2,7 | 3,8 | 2,4 | 3,2 | 2,4 | 2,9 |
| Maximum surface temperature of the test sample (° C.) | 777,0 | 783,0 | 776,0 | 785,0 | 785,0 | 781,2 |
| Surface temperature of the test sample at the end of the test (° C.) | 775,9 | 780,4 | 774,4 | 781,4 | 783,6 | 779,1 |
| Difference in temperature on the surface of the test sample (° C.) | 1,1 | 2,6 | 1,6 | 3,6 | 1,4 | 2,1 |
| Maximum temperature at the centre of the test sample (° C.) | 742,0 | 742,0 | 743,0 | 740,0 | 746,0 | 742,6 |
| Final temperature in centre of the test sample (° C.) | 740,2 | 739,7 | 740,8 | 739,2 | 745,5 | 741,1 |
| Temperature difference at the centre of sample (° C.) | 1,8 | 2,3 | 2,2 | 0,8 | 0,5 | 1,5 |
| Name of the log file | 9747101 | 9747102 | 9747103 | 9747104 | 9747105 | |

According to ISO 1182:1990 (E), a material is considered non-combustible if
(a) The average of the five maximum values from the furnace thermocouple does not show an increase in temperature above that of the final furnace temperature at the end of the tests by more than 50 Centigrade degrees, that is, the material does not increase the temperature by its own burning by more than 50 degrees over that of the furnace.
(b) The average of the five monitored times for duration of sustained flaming does not exceed 20 seconds, and
(c) The average weight loss for the five test samples does not exceed 50% of the original mass after conditioning.

The criteria for classification according to IMO RES.A.799(19) are as follows:
(a) The average of the five maximum values from the furnace thermocouple does not exceed the final furnace temperature at the end of the test by more than 30 Centigrade degrees.
(b) The average of the five maximum values from the thermocouple on the test sample's surface does not rise above the final furnace temperature at the end of the test by more than 30 Centigrade degrees, and
(c) The average weight loss for the five test samples is not more than 50% of the original mass after conditioning.

It can be seen from the results in Table 1 that the mortar composition according to the invention easily exceeds these requirements.

What is claimed is:
1. A method of preparation of a shell sand derived from molluscs, wherein the shell sand is heated at a temperature not exceeding 300° C. for a time sufficient to remove substantially all of the water and organic content while maintaining substantially all of the inherent porosity of the shell sand.
2. A method of preparation of a shell sand derived from molluscs according to claim 1, wherein the shell sand is heated to a maximum temperature of 120° C.
3. A method of preparation of a shell sand derived from mollusks according to claim 1, wherein the shell sand is heated to a temperature in the range of 95° C.–105° C.
4. A method of preparation of a shell sand derived from molluscs according to claim 1, wherein the shell sand is heated to a maximum temperature of 100° C.
5. A method of preparation of a shell sand derived from molluscs according to claim 1 wherein the heating time and corresponding temperature varies between 10 minutes at 300° C. to 60 minutes at 95° C.
6. A method of preparation of a shell sand derived from molluscs according to claim 1, wherein the heating time at 300° C. is no longer than 5 minutes.
7. A dried shell sand derived from molluscs, having a particle size of 15 mm maximum and a porosity of from 10–25% by volume.
8. A dried shell sand derived from molluscs according to claim 7, having a particle size of 15 mm maximum and a porosity of from 15–25%, by volume.
9. A dried shell sand derived from molluscs according to claim 7, wherein the maximum particle size lies between 6–10 mm.
10. A dried shell sand derived from molluscs according to claim 9, wherein most of the particles are of a size no greater than 8 mm.
11. A cementitious composition comprising at least one hydraulic binder and a shell sand wherein the shell sand was heated at a temperature not exceeding 300° C. for a time sufficient to remove substantially all of the water and organic content while maintaining substantially all of the inherent porosity of the shell sand.
12. A fire- or heat-resistant mortar composition comprising at least one hydraulic binder and a shell sand according to claim 7.
13. A fire- or heat-resistant mortar composition according to claim 12, wherein the sole aggregate present is shell sand.
14. A method of providing a concrete substrate with fire or heat resistance, comprising the application thereto of a mortar composition which comprises a shell sand according to claim 7.
15. A fire- or heat-resistant concrete substrate comprising an outer layer of a mortar composition which comprises a shell sand according to claim 7.

* * * * *